United States Patent

Haase et al.

[11] Patent Number: 4,995,736
[45] Date of Patent: Feb. 26, 1991

[54] RADIAL ROLLING BEARINGS

[75] Inventors: Henry Haase, Leichlingen; Joachim Schneider, Dusseldorf, both of Fed. Rep. of Germany; Pierre Alber, Reichshoffen, France

[73] Assignee: INA Walzlager Schaeffler KG, Fed. Rep. of Germany

[21] Appl. No.: 528,032

[22] Filed: May 23, 1990

[30] Foreign Application Priority Data

Jul. 13, 1989 [DE] Fed. Rep. of Germany ....... 3923111

[51] Int. Cl.⁵ ............................................. F16C 41/04
[52] U.S. Cl. ................................... 384/448; 384/581; 384/584; 384/624; 384/903
[58] Field of Search ............... 384/448, 624, 903, 581, 384/584, 563

[56] References Cited

U.S. PATENT DOCUMENTS

| | | | |
|---|---|---|---|
| 4,062,603 | 12/1977 | Orain | 384/903 |
| 4,201,425 | 5/1980 | Freund et al. | 384/448 |
| 4,364,615 | 12/1982 | Euler | 384/903 |
| 4,398,777 | 8/1983 | Murphy | 384/448 |

Primary Examiner—Lenard A. Footland
Attorney, Agent, or Firm—Bierman and Muserlian

[57] ABSTRACT

A radial rolling bearing comprising an outer race ring in whose bore a set of cylindrical rolling elements is arranged, the rolling elements being retained from falling out inwards by an elastic retaining element inserted into the bore of the bearing and stop flanges being provided at both front faces of the rolling elements for their axial fixing, characterized in that at least one of the stop flanges is formed by a detached flanged disc which is retained in its position by an elastic retaining element.

10 Claims, 1 Drawing Sheet

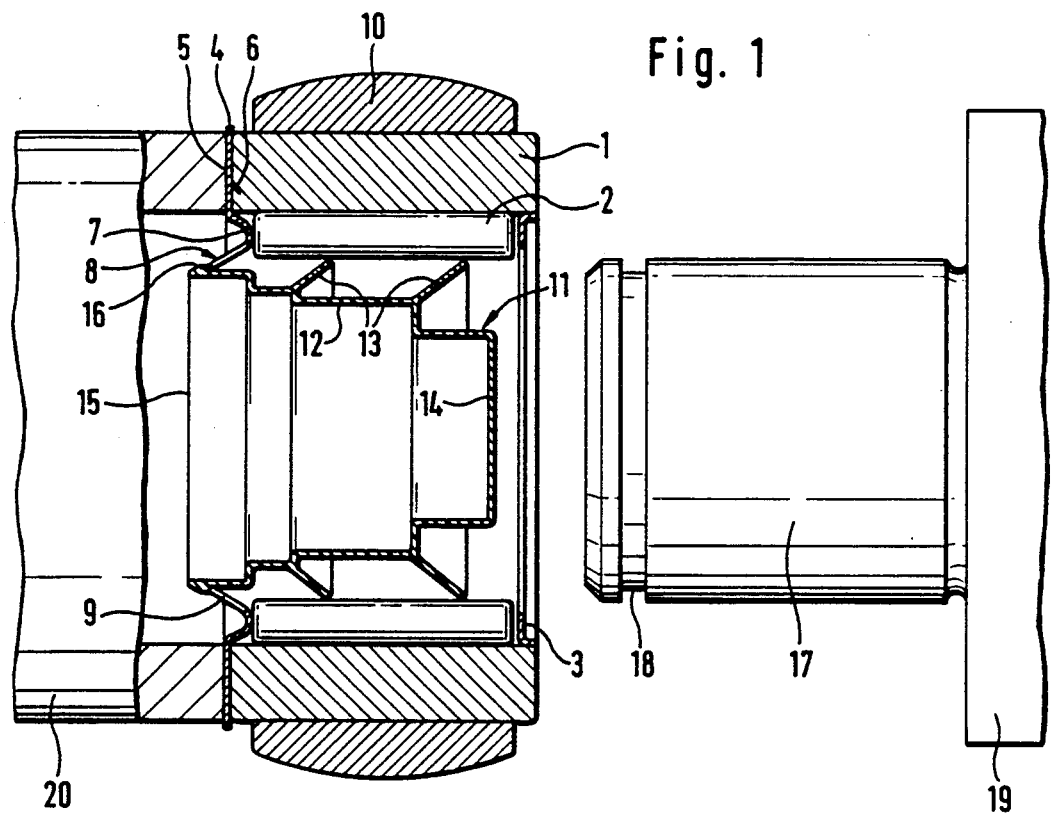
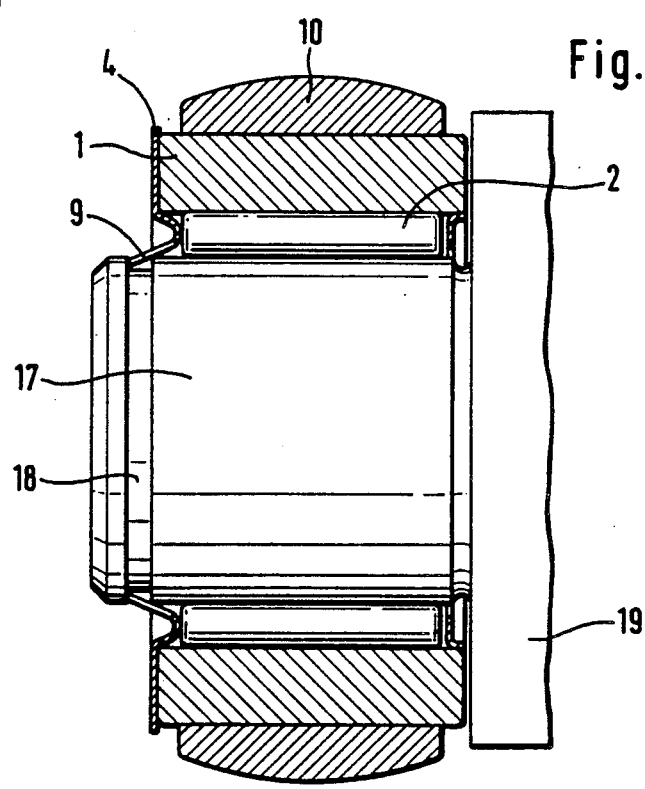

4,995,736

RADIAL ROLLING BEARINGS

STATE OF THE ART

Radial rolling bearings comprising an outer race ring in whose bore a set of cylindrical rolling elements is arranged, the rolling elements being retained from falling out inwards by an elastic retaining element inserted into the bore of the bearing and stop flanges being provided at both front faces of the rolling elements for their axial fixing are known.

In a known bearing of this type described in De-GM No. 1,964,034, bearing needles placed closely together are lodged in a thin-walled sleeve provided with integrally formed stop flanges, the needles being retained from falling out radially inwards by an elastic retaining element made preferably of foamed material. In this way, a bearing unint capable of being transported and mounted without loss of bearing needles is obtained. However, there are some applications in which it is appropriate not to make at least one of the stop flanges in one piece with the race ring.

OBJECTS OF THE INVENTION

It is an object of the invention to provide a bearing unit which is capable of being transported and mounted without damage and without loss of rolling elements with at least one stop flange separate from the race ring.

This and other objects and advantages of the invention will become obvious from the following detailed description.

THE INVENTION

The novel radial rolling bearing of the invention comprising an outer race ring in whose bore a set of cylindrical rolling elements is arranged, the rolling elements being retained from falling out inwards by an elastic retaining element inserted into the bore of the bearing and stop flanges being provided at both front faces of the rolling elements for their axial fixing, is characterized in that at least one of the stop flanges is formed by a detached flanged disc which is retained in its position by an elastic retaining element.

In the radial rolling bearing of the type described, at least one of the stop flanges is formed by a detached flanged disc which is retained in its position by an elastic retaining element which then assumes the function not only of retaining the rolling elements against falling out radially inwards, but at the same time, of fixing them in the axial direction by immobilizing the detached flanged disc in the position which is required for this.

In a radially outer region of its diameter, the flanged disc can be flat and bear with this flat region against an end face of the outer race ring and project radially beyond the outer diameter of the outer race ring at at least a few peripheral points. This can be appropriate when a further displaceable part is arranged on the outer peripheral surface of the outer race ring, which part is thus prevented from slipping off the outer race ring by the flanged disc. It can be appropriate to form the elastic retaining element as a tubular part from whose peripheral surface lamellae widening outwards in the form of a funnel emerge which bear against the rolling elements under elastic pre-tension. At its end away from the flanged disc, the tubular part can be closed by a bottom. It is appropriate to form the lamellae so that they widen in diameter towards the bottom.

To retain the detached flanged disc in its position, the tubular part can be provided at its end away from the bottom with an outer diameter which corresponds approximately to the bore diameter of the flange disc, this end being provided with at least one retaining lug which engages behind the flanged disc at its side turned away from the rolling bearing. It can be appropriate to make the retaining element, for example, of a polymeric material by injection.

REFERRING NOW TO THE DRAWINGS

FIG. 1 is a longitudinal cross-section of a rolling bearing of the invention in the as-delivered state and FIG. 2 is a longitudinal cross-section of the bearing after the insertion of a shaft.

In both Figures, the invention is represented with the help of the example of a rolling element-mounted roller as used in tripod universal joints. The roller comprises the outer race ring 1 in whose bore closely placed cylindrical rolling elements 2 are arranged. A stop flange 3 is pressed in at one end of the outer race ring 1. At the opposite end, a detached flanged disc 4 is provided which bears with a flat region 5 against a plane end face 6 of the outer race ring 1. Towards the center of the disc 4, this flat region 5 is adjoined by a curved region 7 against which the rolling elements 2 can abut and which merges into a funnel-shaped narrowing 8 which is divided into individual tongues 9 by incisions. In its outer region, the detached flanged disc 4 projects beyond the outer diameter of the outer race ring 1 and this assures that the spherical ring 10 mounted displaceable on the outer race ring 1 is prevented from slipping off the outer race ring towards the left.

For the retention of the rolling elements 2 against falling radially inwards and also for the retention of the detached flanged disc 4 in its position, an elastic retaining element 11 is provided which comprises a tubular part 12 which, as shown, can comprise regions of differing diameters and from whose peripheral surface lamellae 13 widening outwards in the form of a funnel emerge which bear against the rolling elements 2 under pre-tension. At its end away from the detached flanged disc 4, the tubular part 12 is closed by a bottom 14.

At its end 15 away from the bottom 14, the tubular part has an outer diameter which corresponds to the bore diameter of the flanged disc 4 in the region of the tongues 9. The end 15 is additionally provided with a retaining lug 16 which extends over the periphery and engages behind the flanged disc 4 at its side turned away from the rolling bearings.

In FIG. 1, to the right of the rolling element-mounted roller, a shaft 17 is represented which is provided with a peripheral groove 18 and which at its other end merges into a shoulder 19 of a housing. This shaft 17 is to be inserted into the rolling element-mounted roller. For doing this, the roller together with the detached flanged disc 4 is supported against a tube 20 by which, at the insertion of the shaft 17, the detached flanged disc 4 is retained in its position, the elastic retaining element 11 being at the same time pushed out towards the left and removed after it has passed through the bore of the tube 20.

In FIG. 2, the rolling element-mounted roller is represented after its mounting on the shaft 17. The bore diameter of the flanged disc 4 is smaller than the inner enveloping circle diameter of the rolling elements 2. For this reason, the tongues 9 forming the inner edge of the flanged disc 4 are snapped into the peripheral groove 18 of the shaft 17 mounted in the rolling bearing. The introduction of the flanged disc 4 into the peripheral groove 18 is made easier by the fact that, in the region of its diameter adjacent to its bore, the flanged disc 4 narrows in the form of a funnel in the outward direction of the bearing. After the tongues 9 have snapped into the peripheral groove 18, the outer race ring 1 is fixed in the axial direction between the flanged disc 4 on one side and the shoulder 19 of the housing on the other. The spherical ring 10 which is displaceably mounted on the outer race ring 1 is secured in the axial direction in the same way and by the same parts.

Various modifications of the radical rolling bearing of the invention may be made without departing from the spirit or scope thereof and it should be understood that the invention is intended to be limited only as defined in the appended claims.

What I claim is:

1. A radial rolling bearing comprising an outer ring in whose bore a set of cylindrical rolling elements is arranged, the rolling elements being retained from falling out inwards by an elastic retaining element inserted into the bore of the bearing and stop flanges being provided at both front faces of the rolling elements for their axial fixing, characterized in that at least one of the stop flanges is formed by a detached flanged disc which is retained in its position by an elastic element.

2. A rolling bearing of claim 1 wherein in a radially outer region of its diameter the flanged disc is flat and bears with this region against an end face of the outer race ring and projects radially beyond the outer diameter of the outer race ring at at least a few peripheral points.

3. A rolling bearing of claim 2 wherein the elastic retaining element is formed by a tubular part from whose peripheral surface lamellae widening outwards in the form of a funnel emerge which bear against the rolling elements under elastic pre-tension.

4. A rolling bearing of claim 1 wherein the elastic retaining element is formed by a tubular part from whose peripheral surface lamellae widening outwards in the form of a funnel emerge which bear against the rolling elements under elastic pre-tension.

5. A rolling bearing of claim 4 therein the tubular part is closed by a bottom at its end away from the flanged disc.

6. A rolling bearing of claim 5 wherein the lamellae widen in diameter towards the bottom of the tubular part.

7. A rolling bearing of claim 5 wherein the retaining element is made of polymeric material.

8. A rolling bearing of claim 4 wherein the lamellae widen in diameter towards the bottom of the tubular part.

9. A rolling bearing of claim 4 wherein the retaining element is made of polymeric material.

10. A rolling bearing of claim 1 wherein the tubular part has at its end away from the bottom an outer diameter which corresponds approximately to the bore diameter of the flanged disc and this end is provided with at least one retaining lug which engages behind the flanged disc at its side turned away from the rolling bearing.

* * * * *